United States Patent [19]
Wessels et al.

[11] Patent Number: 5,669,120
[45] Date of Patent: Sep. 23, 1997

[54] MOLDED SURFACE FASTENER

[75] Inventors: Roger Thor Wessels; Piljae Cho, both of Macon, Ga.

[73] Assignee: YKK Corporation, Tokyo, Japan

[21] Appl. No.: 730,846

[22] Filed: Oct. 17, 1996

Related U.S. Application Data

[63] Continuation of Ser. No. 437,930, May 9, 1995, abandoned.

[51] Int. Cl.⁶ .......................... A44B 13/00; B29C 41/30
[52] U.S. Cl. .............. 24/446; 264/167; 24/445; 24/452
[58] Field of Search ............... 24/306, 442–452, 24/575–578; 204/167

[56] References Cited

U.S. PATENT DOCUMENTS

| | | | |
|---|---|---|---|
| 3,387,345 | 6/1968 | Savoir | 24/446 |
| 3,399,425 | 9/1968 | Lemelson . | |
| 3,555,630 | 1/1971 | Wylde | 24/447 |
| 3,594,863 | 7/1971 | Erb . | |
| 3,594,865 | 7/1971 | Erb . | |
| 3,608,035 | 9/1971 | Fröhlich . | |
| 3,758,657 | 9/1973 | Menzin et al. | 264/167 X |
| 4,541,154 | 9/1985 | Ito et al. | 24/446 X |
| 4,592,118 | 6/1986 | DeWoskin | 24/444 |
| 4,654,246 | 3/1987 | Provost et al. | 428/88 |
| 4,931,344 | 6/1990 | Ogawa et al. | 24/444 X |
| 4,999,067 | 3/1991 | Erb et al. | 24/444 X |
| 5,142,743 | 9/1992 | Hahn | 24/442 X |
| 5,231,738 | 8/1993 | Higashinaka | 24/446 |
| 5,260,015 | 11/1993 | Kennedy et al. | 264/167 |
| 5,369,852 | 12/1994 | Higashinaka | 24/446 |
| 5,393,475 | 2/1995 | Murasaki et al. | 264/167 X |
| 5,441,687 | 8/1995 | Murasaki et al. | 264/167 |
| 5,512,234 | 4/1996 | Takizawa et al. | 264/167 X |
| 5,518,795 | 5/1996 | Kennedy et al. | 24/306 X |

FOREIGN PATENT DOCUMENTS

| | | |
|---|---|---|
| 0580 073 A2 | 1/1994 | European Pat. Off. . |
| 0 581 570 A2 | 2/1994 | European Pat. Off. . |
| 2017 522 | 12/1971 | Germany . |
| 1166935 | 10/1969 | United Kingdom . |

*Primary Examiner*—Peter M. Cuomo
*Assistant Examiner*—Robert J. Sandy
*Attorney, Agent, or Firm*—Hill, Steadman & Simpson

[57] ABSTRACT

In a molded surface fastener, at least part of a substrate sheet and hook elements are molded of synthetic resin, and simultaneously with the molding of the substrate sheet, at least part of foundation structure of a pile woven or knit core sheet is integrated with the substrate sheet which is molded of synthetic resin in such a manner that loop elements in the form of piles standing from the pile woven or knit core sheet are exposed to the front surface of the substrate sheet. The height of the hook elements is greater than that of the loop elements, and the foundation structure of the pile woven or knit core sheet is a coarse woven or knit structure having adequate pores throughout its entire area to allow molten resin to pass through. The hook elements and loop elements stand on the same surface or either of the front and back surfaces of the substrate sheet.

6 Claims, 6 Drawing Sheets

FIG. 9

MOLDED SURFACE FASTENER

This is a continuation of application Ser. No. 08/437,930, filed May 9, 1995, now abandoned.

BACKGROUND OF THE INVENTION

1. Field of the Invention

This invention relates to a surface fastener molded of thermoplastic resin by continuous injection or extrusion and having a plate-like substrate sheet and a multiplicity of engaging elements standing on one or both surfaces of the plate-like substrate sheet, and more particularly to a molded surface fastener in which a multiplicity of molded male engaging elements of synthetic resin and a multiplicity of female engaging elements in the form of fiber piles stand from one or both surfaces of the substrate sheet.

2. Description of the Related Art

A surface fastener is currently known in which a multiplicity of hook- or mushroom-shape engaging elements of a monofilament and a multiplicity of loop elements of multifilaments mixedly stand from one surface of a substrate cloth. This conventional art is exemplified by U.S. Pat. No. 5,231,738, in which the hook- or mushroom-shape engaging elements have a height less than the height of the loop elements in an effort to secure a desired rate of engagement and a good touch of the engaging surface.

According to the invention disclosed in U.S. Pat. No. 5,260,015, molten thermoplastic resin is extruded to the gap between a rotating drum-shape die wheel, in which a multiplicity of mold disks and a multiplicity of spacer plates are laminated alternately, and a press roller, and a core sheet having a multiplicity of piles is introduced between the extruded resin and the press roller. As the core sheet is thus introduced, part of the resin is penetrated into the core sheet by the pressing force of the press roller to integrate with the substrate and, at the same time, part of the resin is filled in hook-element-forming circumferential cavities of the die wheel to mold a multiplicity of hook elements. The resulting surface fastener, in which the core sheet is integrally attached to the substrate at its back surface opposite to the hook surface, is cooled while traveling through a predetermined angle along the circumferential surface of the die wheel following the rotation of the die wheel, whereupon the molded hook elements are pulled out of the cavities and, at the same time, the substrate is continuously peeled off the circumferential surface of the die wheel.

With the surface fastener disclosed in U.S. Pat. No. 5,231,738, partly since the substrate is a cloth made of synthetic resin fibers or metal fibers and partly since the hook- or mushroom-shape engaging elements and the loop elements standing from the substrate are also made of fiber material, its production needs mainly the fiber processing technology requiring a large number of meticulous steps, which raises the cost of product. Moreover, in the surface fastener with male and female elements distributed mixedly, the male and female engaging elements are formed at the time of weaving or knitting as described above. However, though it is desirable to give a napping process to the loop elements which consists female engaging elements in order to improve the engaging rate of the loop elements, it is impossible to give the napping process to a surface where male engaging elements are distributed. Therefore, the form of the loop elements cannot be changed before nor after the weaving or knitting.

Further, since its basic structure is composed of fibers, the engaging force of this prior surface fastener is limited. As application of this type surface fastener has been expanded in recent years to a wide variety of fields, for example, from industrial material fasteners requiring a relatively great engaging force to paper diaper fasteners requiring adequate softness and low price, the number of functions of the modern fasteners are on the rise. The above-mentioned surface fastener composed of fiber material could hardly meet such expanded variety of requirements.

On the other hand, in the surface fastener disclosed in U.S. Pat. No. 5,260,015, not only since the core sheet having piles is located in the substrate necessarily eccentrically toward its back side, but also since the piles are pressed by the press roller toward the circumferential surface of the die wheel to be integrally attached to the substrate surface which is formed of molten resin, the function of piles tends to be impaired. In order to prevent this problem, a pile supporting portion, i.e. the core sheet, needs such a high density not to allow molten resin to pass through. In this case, merely by that a part of molten resin of the substrate penetrates into the back side of the pile supporting portion to the core sheet is fused integrally therewith.

However, according to the manufacturing method disclosed in U.S. Pat. No. 5,260,015, the surface fastener in which the core sheet is embedded in the substrate eccentrically toward the back side is revolved through a predetermined angle along the circumferential surface of the die wheel in one-way rotation and is then positively peeled off the circumferential surface of the die wheel under a predetermined tension. Even in the case where the core sheet is not attached, since the hook elements molded in the hook-element-forming circumferential cavities of the die wheel have to be positively removed, the substrate is stretched as a relatively great pulling force is exerted on the substrate, apart from any deformation of the hook elements. Accordingly, in the core-sheet-free surface fastener, the substrate is stretched substantially uniformly on both the front and back sides. Whereas in the case of the surface fastener containing the core sheet, when the surface fastener molded on the circumferential surface of the die wheel is positively peeled off, the substrate is less extendible at the back side, where the core sheet exists, and is more extendible at the front side, where the hook elements exist. Therefore, after completion of the molding, the surface fastener has different lengths at the front and back sides so that the surface fastener is curved convexly at the hook-element side and it is difficult to control the coefficient of extension of the front side, thus resulting in a non-uniform density of hook elements. In use, it is not only inconvenient when such surface fastener is attached to an objective good, but also a constant rate of engagement cannot be achieved to impair the quality of product.

SUMMARY OF THE INVENTION

With the foregoing problems in view, it is a first object of this invention to provide a high-quality surface fastener, on which molded hook elements and loop elements made of fibers are mixedly distributed, which is stable in shape as being extrusion- or injection-molded using a simple molding apparatus without any reconstruction.

A second object of the invention is to secure an adequate degree of toughness of the hook-element side of a plate-like substrate sheet of the surface fastener and to realize a highly precise density of hook elements.

A third object of the invention is to provide a molded surface fastener in which loop elements made of fibers and molded hook elements coexist, with the loop elements being given the napping process.

According to this invention, there is provided a surface fastener molded of synthetic resin, comprising: a plate-like substrate sheet, a multiplicity of hook elements, and loop elements. In this surface fastener, the hook elements are molded of a synthetic resin material integrally on one surface of the plate-like substrate sheet, and the loop elements are composed of piles projecting from a pile woven or knit cloth. And at least part of a foundation structure of the pile woven or knit cloth is formed integrally with the substrate sheet simultaneously with the molding of the substrate sheet.

Figure 9:
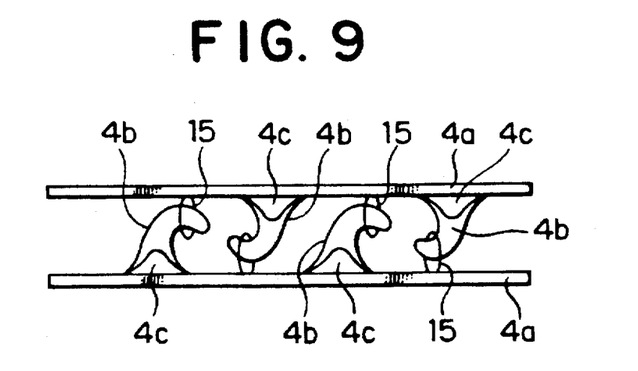
FIG. 9 is a side view showing the manner in which a pair of mating surface fasteners of this invention come into engagement with each other.

Preferably, the height of the hook elements is greater than the height of the loop elements unlike the conventional surface fastener disclosed in U.S. Pat. No. 5,231,738 in which the hook elements are shorter than the loop elements. In the surface fastener of this invention, since the hook elements are molded of synthetic resin and not formed of monofilaments, the individual hook element has at its top a smoothly curved surface with no rough touch and is highly stable in shape, so that hook elements are easy to engage the loop elements in spite of the short loop elements as shown in FIG. 9 and the gap between the mating substrate sheets can be reduced to a minimum during engaging.

Further, in the surface fastener of this invention, the foundation structure of the pile woven or knit cloth is a coarse woven or knit structure having pores large enough to pass molten resin material throughout its entire area, and the hook and loop elements exist mixedly on the one surface of the substrate sheet. In an alternative form, the foundation structure of the pile woven or knit cloth is high in density at its pile areas and has a coarse woven or knit structure at the remaining areas coarse enough to pass molten resin material. Further, the hook elements and the loop elements may be arranged alternately in parallel predetermined regions on the one surface of the substrate sheet.

The pile woven or knit cloth to be used in this invention must have adequate pores for the passage of molten resin. Usually, a molten resin pressure of 50–150 kg/cm$^2$ acts on the pile woven or knit cloth during the continuous injection. The size of the pores in the cloth which allows the molten resin to smoothly pass through under this resin pressure is preferably at least 0.05 mm. A desired mesh size may be obtained by changing the weave density and/or woven structure if the cloth is a woven cloth, the knit density and/or knit structure if it is a knitted cloth, and the mesh if it is a wire net. The thickness of foundation structure of the pile woven or knit cloth is determined by the thickness of the substrate sheet of the surface fastener to be molded and its use; in view of facilitation of molding, however, the thickness of the foundation structure is preferably 20–60% of that of the substrate sheet. Accordingly, the size of yarns, wires or fibers of the foundation structure may be determined optionally by the required thickness of the foundation structure.

And it is advantageous that, in this invention, it is possible to treat a pile surface of the pile woven or knit core sheet having the aforesaid structure with the napping process before integral molding with the molten synthetic resin. This has been impossible even in a surface fastener where hook and loop elements both made of fibers coexist as described above, and is realized by the present invention.

The surface fastener thus constructed is effectively manufactured by the following typical methods.

One typical manufacturing method is a continuous injection molding method in which a die wheel having in its circumferential surface a multiplicity of engaging-element-forming cavities is driven for one-way rotation and, at the same time, molten resin is continuously injected from a molten resin outlet of an injection die, which confronts the die wheel with a predetermined gap therebetween, to the circumferential surface of the die wheel by a predetermined width. Simultaneously, a coarse pile woven or knit cloth having piles on its one surface is continuously introduced into the gap between the die wheel and the molten resin outlet of the injection die. At that time, it is preferable to introduce the pile woven or knit cloth with the pile surface in contact with the circumferential surface of the die wheel. For this purpose, the circumferential surface of the die wheel has annular recesses spaced from the hook-element-forming cavities for receiving and guiding the pile surface.

The molten resin injected from the injection die toward the circumferential surface of the die wheel form the substrate sheet in the gap, and at the same time, part of the molten resin reaches the circumferential surface of the die wheel through the pores of the pile woven or knit cloth to embed the foundation structure of the pile woven or knit cloth in the molten resin injected from the injection die and to fill the hook-element-forming cavities to form hook elements. Then, while the circumferential surface of the die wheel is positively cooled by a cooling means to cool the molded surface fastener, the cooled molded surface fastener is continuously taken up from the circumferential surface of the die wheel.

Another typical manufacturing method is an extrusion molding method in which the die wheel having a multiplicity of engaging-element-forming cavities and annular recesses and a press roller confronting the die wheel with a predetermined gap are rotated synchronously in opposite directions. Simultaneously, molten resin is continuously extruded from an extrusion nozzle to the gap between the die wheel and the press roller by a predetermined width and, at the same time, the coarse pile woven or knit cloth is continuously introduced between the die wheel and the molten resin extruded from the extrusion nozzle. The molten resin forms the substrate sheet in the gap by the pressing force of the press roller and, at the same time, part of the molten resin reaches the circumferential surface of the die wheel through the pores of the pile woven or knit cloth to embed the pile woven or knit cloth in the molten resin and to fill the hook-element-forming cavities to form hook elements. Then, while the circumferential surface of the die wheel is positively cooled by the cooling means to cool the molded surface fastener, the cooled molded surface fastener is continuously taken up from the circumferential surface of the die wheel.

The pile woven or knit cloth whose foundation structure is at least partly embedded in the substrate sheet serves to assist in peeling the molded surface fastener off the die wheel. Namely, the substrate sheet formed on the circumferential surface of the die wheel is less extendible and is highly resistant against pull when the molded surface fastener is positively peeled off the circumferential surface of the die wheel after revolving along the rotation of the die wheel. Therefore, the pulling force acts effectively on the molded hook elements in the circumferential cavities of the die wheel so that the molded hook elements can be pulled out of the cavities without difficulty. Since the hook-element-side surface of the substrate sheet is hardly stretched, there occurs no difference in stretch between the front and back sides of the substrate sheet so that the surface fastener does not become curved in one direction after molding and the hook elements are distributed uniformly, thus causing a high-quality surface fastener which is uniform in engaging strength is obtained.

DETAILED DESCRIPTION OF THE PREFERRED EMBODIMENTS

Preferred embodiments of this invention will now be described with reference to the accompanying drawings.

Figure 1:
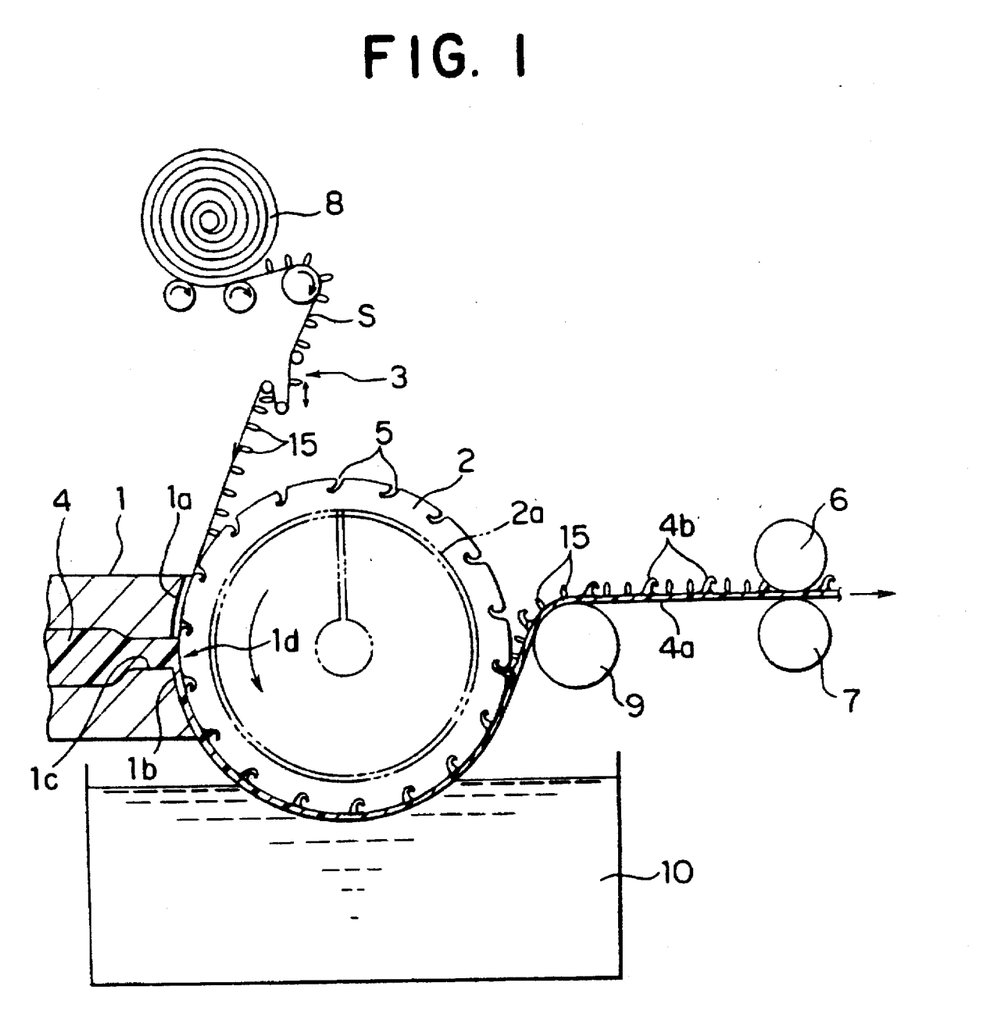
FIG. 1 is a fragmentary vertical cross-sectional view showing an apparatus for manufacturing a molded surface fastener according to a first embodiment of this invention.

FIG. 1 is a fragmentary vertical cross-sectional view of a continuous injection molding apparatus for manufacturing a molded surface fastener according to a first embodiment of this invention.

In FIG. 1, reference numeral 1 designates an injection die; an upper half surface of the distal end of the injection die is an arcuate surface 1a substantially equal in curvature to a die wheel 2 described below, and a lower half surface is an arcuate surface 1b having such a curvature as to define a predetermined gap with respect to the curved surface of the die wheel 2. The injection die 1 is a T-shape die having a resin extrusion outlet 1d which is situated centrally of the upper and lower arcuate surfaces 1a, 1b and from which molten resin 4 is injected in a sheet form under a predetermined molten resin pressure. In this embodiment, the injection die 1 has a single molten resin runner 1c extending centrally.

Figure 2:
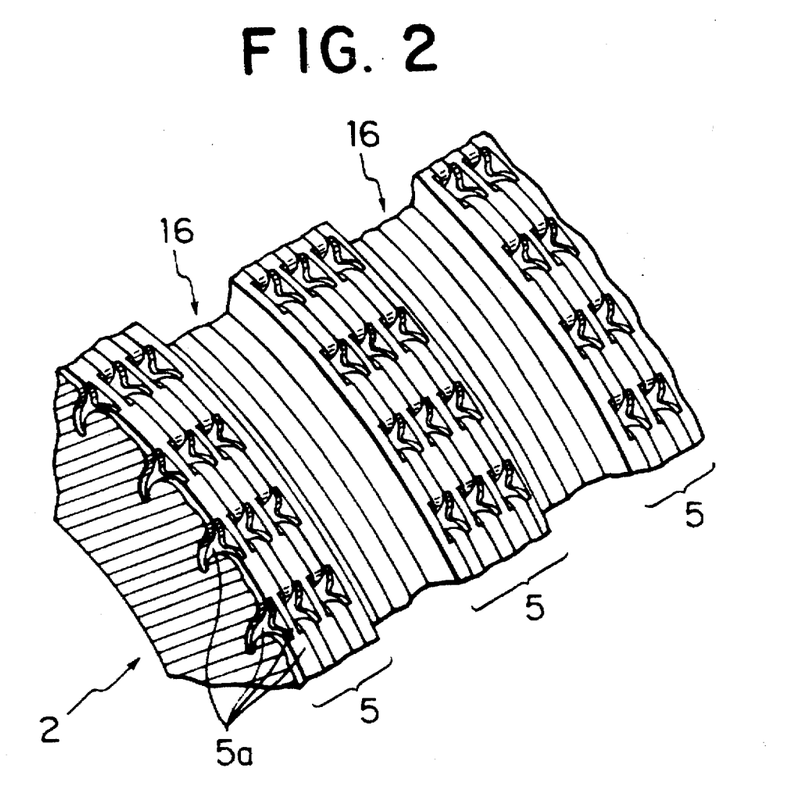
FIG. 2 is a fragmentary, enlarged perspective view of a die wheel of the apparatus of FIG. 1.

The die wheel 2 has a circumferential surface partially adjacent to the upper arcuate surface 1a of the injection die 1 and is spaced from the lower arcuate surface 1b by the predetermined gap, with its axis parallel to the extrusion outlet 1d of the injection die 1. According to the illustrated embodiment, a number of hook-element-forming cavity sets 5 are arranged on the circumferential surface of the die wheel 2, adjacent cavity sets being spaced by a predetermined distance in a direction parallel to the axis of the die wheel 2 to define therebetween an annular recess 16. The basic structure of the die wheel 2 is substantially identical with the structure disclosed in U.S. Pat. No. 4,775,310 with slight modification and is hence described here only briefly. The die wheel 2 is in the form of a hollow drum having a water cooling jacket 2a, and in each cavity set portion, a number of die rings and a number of spacer rings are laminated alternately along the axis of the hollow drum as shown in FIG. 2. Each of the die rings has on circumferential edges a multiplicity of hook-element-forming cavities 5a with their bases opening to the circumferential surface of the die ring. Each of the spacer rings has on each of front and back sides a flat surface. Each annular recess 16 is composed of a number of laminated rings, having a predetermined outer diameter smaller than the outer diameter of the die rings of each cavity set 5. The die wheel 2 is driven, by a non-illustrated known synchronous drive unit, to rotate in a direction indicated by an arrow.

A pile woven or knit core sheet (hereinafter called "the pile core sheet") S drawn from a roll is introduced to the gap between the upper arcuate surface 1a of the injection die 1 and the circumferential surface of the die wheel 2 via a tension adjuster 3 after contacting part of the circumferential surface of the die wheel 2. In this illustrated embodiment, a cooling water tank 10 is situated under the die wheel 2 with a lower portion of the die wheel 2 being soaked in the cooling water tank 10. A guide roller 9 is situated diagonally upwardly of the cooling water tank 10, and a set of upper and lower take-up rollers 6, 7 rotating at a speed slightly higher than the rotating speed of the die wheel 2 is situated in front of the guide roller 9.

Figure 3:
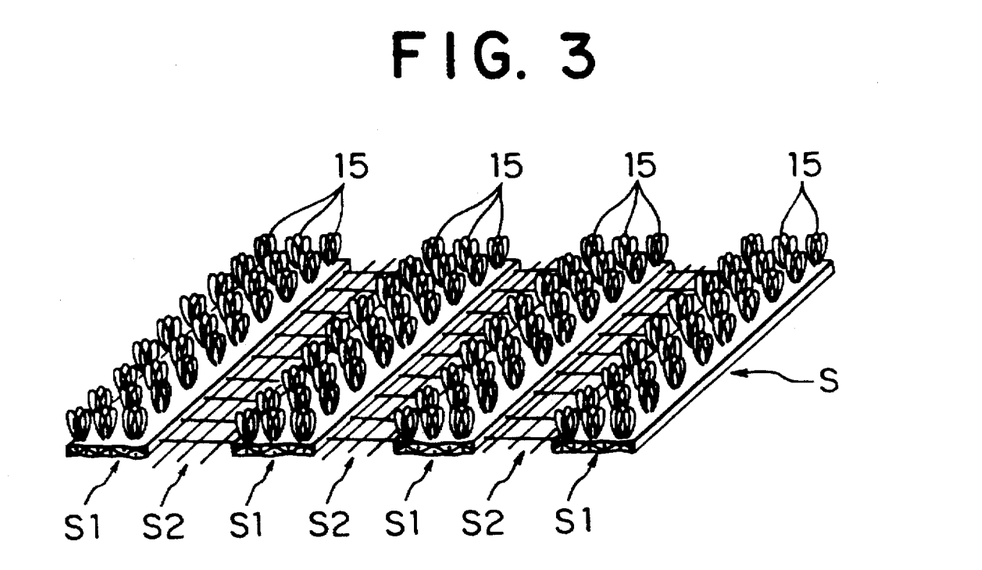
FIG. 3 is a fragmentary perspective view of a pile core sheet to be used in the surface fastener manufactured according to the first embodiment.

The pile core sheet S to be used in this embodiment has a number of pile regions S1 of a predetermined width and a number of coarse mesh regions S2 of a predetermined width arranged alternately in the transverse direction as shown in FIG. 3. The foundation structure of each pile region S1 is woven or knitted of fiber at a high density so as not to allow molten resin 4 to pass through, and the coarse mesh region S2 is devoid of piles and is woven or knitted of fiber so as to have pores for the passage of molten resin 4. Further, in this embodiment, a pile surface of the pile regions S1 of the pile core sheet S is treated with a napping process. Therefore, the pile surface acquires greater flexibility, and the multifilament piles consisting loop elements 15 have various loop directions so that the engaging rate with mating hook elements 4b increases.

The fiber material is thermoplastic resin as exemplified by nylon, polyester and polypropylene or metal wire. Although the thermoplastic synthetic resin for the surface fastener and the fiber material are preferably the same, they may be different. The size of the fibers, fiber yarns or metal wires of the pile core sheet S is determined by the required thickness of the pile core sheet S. Further, the thickness of the pile core sheet S, which is determined depending on the thickness of the substrate sheet 4a of the surface fastener, is usually preferably 20–60% of the thickness of the substrate sheet 4a. In compliance with the resin material to be used, the molten resin temperature, molten resin pressure, die wheel temperature and rotational speed of the die wheel are adjusted as a matter of course. The required molten resin pressure is usually in the range of 50–150 kg/cm$^2$, preferably 80–110 kg/cm$^2$.

In this embodiment, the height of the hook elements 4b is greater than that of the loop elements 15 unlike the surface fastener disclosed in U.S. Pat. No. 5,231,738 in which the hook elements are shorter than the loop elements. In the prior surface fastener, the hook elements are formed by cutting part of monofilament loops that are formed simultaneously with the weaving or knitting of the surface fastener, so that the cut remainings projecting from the foundation structure and possible burrs formed when cutting would give an uncomfortable touch during the engaging. In order to give a comfortable touch, in the prior surface fastener, the loop elements are higher than the hook elements. In the surface fastener of this invention, since the hook elements 4b are molded of synthetic resin and not formed of monofilaments, the individual hook element 4b has at its top a smoothly curved surface with no rough touch and is highly stable in shape, so that hook elements are easy to engage the loop elements 15 in spite of the short loop elements 15 as shown in FIG. 9 and the gap between the mating substrate sheets 3 can be reduced to a minimum during engaging.

For molding the surface fastener of this invention on the apparatus, the molten resin 4 to be continuously injected from the injection die 1 at a predetermined molten resin pressure is continuously forced into the gap between the injection die 1 and the rotating die wheel 2. At the same time, the pile core sheet S is guided with the piles being received in the annular recesses 16 of the die wheel 2, and part of the molten resin 4 penetrates into the foundation structure of the pile regions S1 at the injection-outlet side, while part of the molten resin 4 is extruded onto the circumferential surface of the die wheel 2 through the pores of the coarse mesh regions S2, filling in the hook-element-forming cavities 5a successively to form hook elements 4b as the molten resin 4 is expanded uniformly over the circumferential surface of the die wheel 2. As a result, the molten resin 4 remaining on the injection outlet of the injection die 1 and the expanded molten resin 4 are fused with the component material of the pile core sheet S to form the substrate sheet 4a having a predetermined thickness.

During this molding, the pile core sheet S keeps traveling around the circumferential surface of the die wheel 2 as it is forced thereagainst under molten resin pressure. Therefore, in the manufacturing method of this embodiment, it is unnecessary to intentionally force the pile core sheet S against the circumferential surface of the die wheel 2 while introducing; namely, as it is introduced into the above-mentioned gap merely with a just slack-free tension, the pile core sheet S is necessarily forced against the circumferential surface of the die wheel 2 so that the pile core sheet S is embedded in the substrate sheet 4a of the molded surface fastener eccentrically toward the hook-element-surface side or front-surface side as shown in FIG. 2.

Figure 4A:
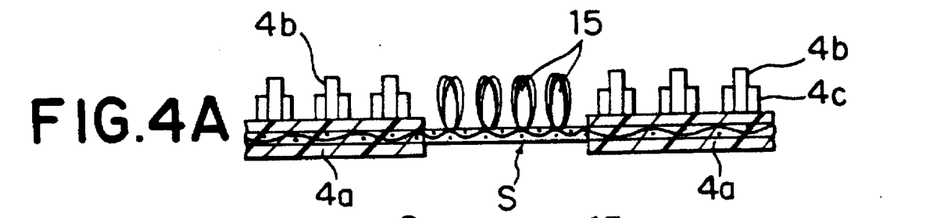
FIGS. 4A through 4F are fragmentary cross-sectional views of various modifications of the surface fastener according to this invention.
Figure 4B:
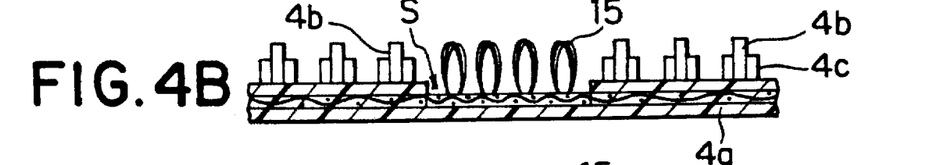
Figure 4C:
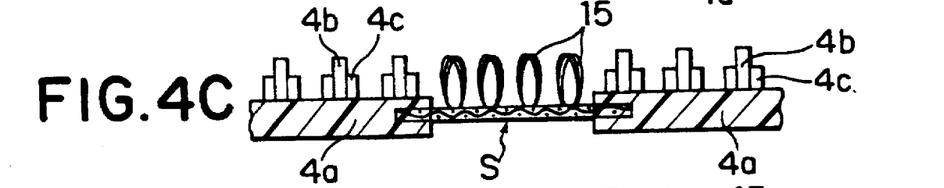

The molten resin 4 shaped into the surface fastener on the circumferential surface of the die wheel 2 travels around substantially a half of the circumferential surface of the die wheel 2 as guided by the guide roller 9. During that time, the molten resin 4 is cooled from the inside of the die wheel 2 and is further cooled while passing through the cooling water tank 10 so that the substrate sheet 4a, in which the pile core sheet S is embedded, integrally with the hook elements 4b become gradually hard. When the substrate sheet 4a is positively taken up horizontally by the take-up rollers 6, 7 durinng this hardening, since the pile core sheet S is embedded in the substrate sheet 4a eccentrically toward the hook-element-surface side, the pile-core-sheet-embedded-side surface of the substrate sheet 4a does not extend even if it is pulled away from the circumferential surface of the die wheel 2, so that the front and back surfaces of the substrate sheet 4a have no difference of extension, thereby making the surface fastener free from curving in one direction after being removed from the die wheel 2. Accordingly, the uniform engaging strength and a uniform density of hook elements can be achieved over the entire surface of the surface fastener, and the individual hook elements 4b can be pulled out of the cavities 5a smoothly as they resiliently deform. Immediately after being removed off the die wheel 2, the hook elements 4b restore their original shape to become hard completely and, the surface fastener on which the multifilaments consisting the loop elements 15 face various directions, as shown in FIG. 4F. In this instance, if the napping process is not treated to the pile core sheet S beforehand, all filaments of the multifilament loop elements 15 face almost the same direction, as shown in FIG. 4B.

In this embodiment, in order to peel the molded resin product (i.e., the surface fastener with the pile core sheet embedded in the substrate sheet) off the die wheel 2, the upper and lower take-up rollers 6, 7 synchronously rotating in opposite directions are used. The circumferential surfaces of these take-up rollers 6, 7 may be smooth but preferably have circumferential grooves for receiving the hook elements 4b so as not to damage them. The rotational speed of the take-up rollers 6, 7 is slightly higher than that of the die wheel 2 in such a manner that the hook elements 4b can be removed smoothly off the hook-element-forming cavities 5a.

In the thus manufactured surface fastener, since the pile core sheet S is embedded in the substrate sheet 4a eccentrically toward the hook-element-surface side, it is possible to give the substrate sheet 4a adequate toughness both longitudinally and transversely so that products of uniform quality can be obtained as mentioned above. In the resulting surface fastener, no stretch occurs during cutting under tension, and no breakage of a sewing needle occurs during sewing.

Figure 5:
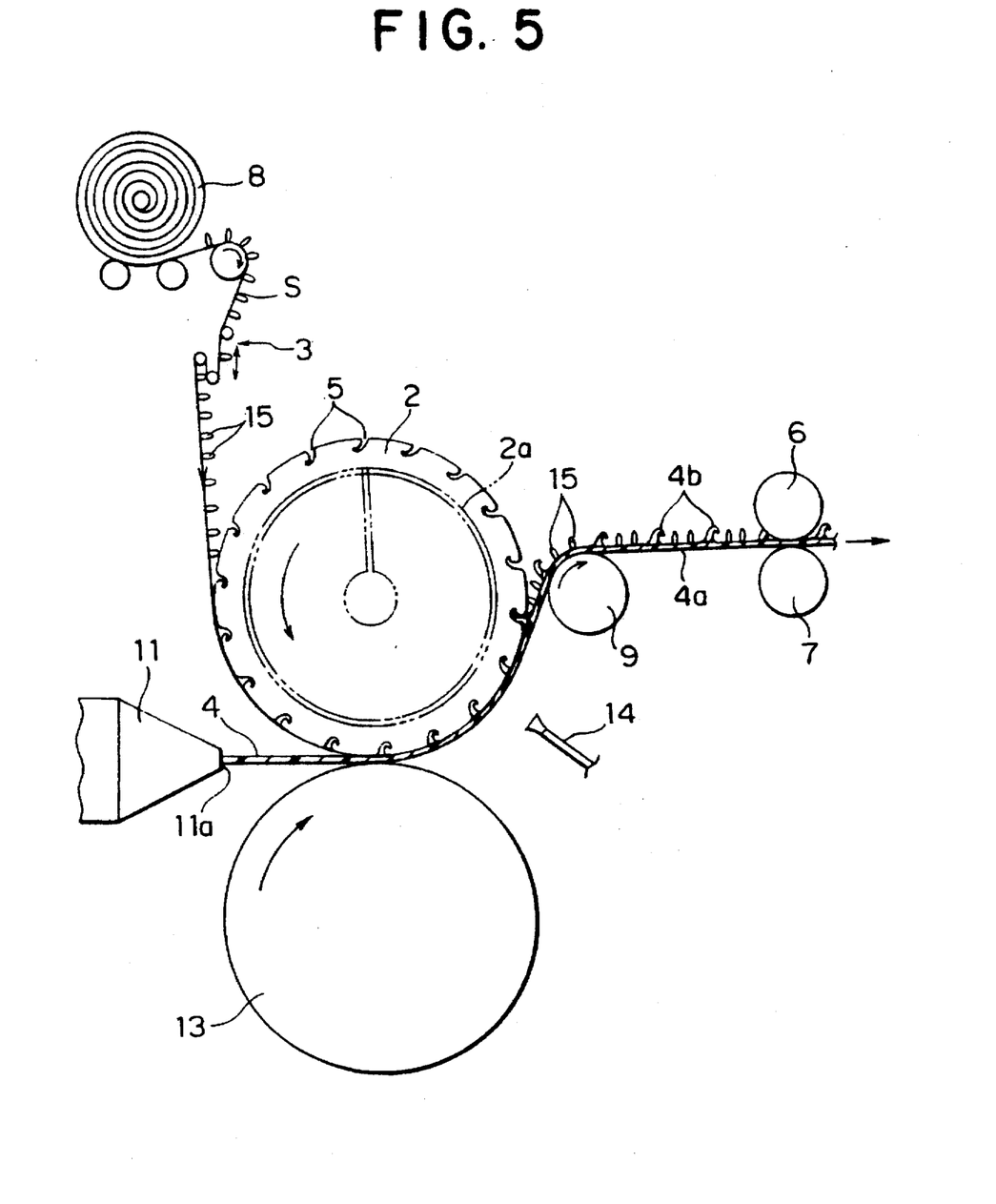
FIG. 5 is a fragmentary vertical cross-sectional view of another apparatus for manufacturing a molded surface fastener according to a second embodiment of this invention.

FIG. 5 is a vertical cross-sectional view of an apparatus for manufacturing a surface fastener according to a second embodiment of this invention by extrusion molding.

In the second embodiment, an extrusion nozzle 11 is used to substitute for the injection die 1, and a press roller 13 is situated under the die wheel 2 with a predetermined gap. A molten resin extrusion outlet 11a of the extrusion nozzle 11 is situated to face the gap between the die wheel 2 and the press roller 13. In this embodiment, the most important point is that the pile core sheet S is introduced into the gap between the circumferential surface of the die wheel 2 and the molten resin 4, which is extruded from the molten resin extrusion outlet 11a of the extrusion nozzle 11, via the tension adjusting section 3, after partially contacting the circumferential surface of the die wheel 2. Further, a cooling water jacket 2a for cooling the circumferential surface of the die wheel 2 from the inside is situated in the die wheel 2, and a cooling air blower 14 is situated for blowing cooling air to the circumferential surface of the die wheel 2 having passed the pressing surface of the press roller 13. The die wheel 2 and the press roller 13 are driven, by a non-illustrated drive unit, to synchronously rotate in opposite directions as indicated by arrows in FIG. 5.

A guide roller 9 is situated diagonally upwardly of the cooling air blower 14, and a set of upper and lower take-up rollers 6, 7 rotating at a speed slightly higher than that of the die wheel 2 are situated in front of the guide roller 9.

According to the thus constructed apparatus, the molten resin 4 extruded from the extrusion nozzle 11 is introduced to the gap between the press roller 13 and the pile core sheet S, which is introduced along the circumferential surface of the die wheel 2, to be forced through the pores of the pile core sheet S to the circumferential surface of the die wheel 2 by the pressing force of the pressing roller 13. The pile core sheet S is guided with the piles being received in the annular recesses 16 of the die wheel 2, and at the same time, part of the molten resin 4 penetrates into the foundation structure of the pile regions S1 at the extrusion-outlet side while part of the molten resin 4 is extruded onto the circumferential surface of the die wheel 2 through the pores of the coarse mesh regions S2, filling in the hook-element-forming cavities 5a successively to form hook elements 4b as the molten resin 4 is expanded uniformly over the circumferential surface of the die wheel 2. The thus molded surface fastener of this invention travels along substantially a quarter of the die wheel 2 and is then continuously removed off the circumferential surface of the die wheel 2 as positively take up by the take-up rollers 6, 7 via the guide roller 9.

Meanwhile, the molded surface fastener is gradually cooled by a cooler 2a in the die wheel 2 and is further cooled by air blown from the cooling air blower 14, thus becoming hard. In this embodiment, if the pile core sheet S to be introduced to the gap between die wheel 2 and the press roller 13 is previously heated to eliminate any difference in temperature from the semimolten high-temperature substrate sheet 4a, their fusion will be more reliable.

Figure 6:
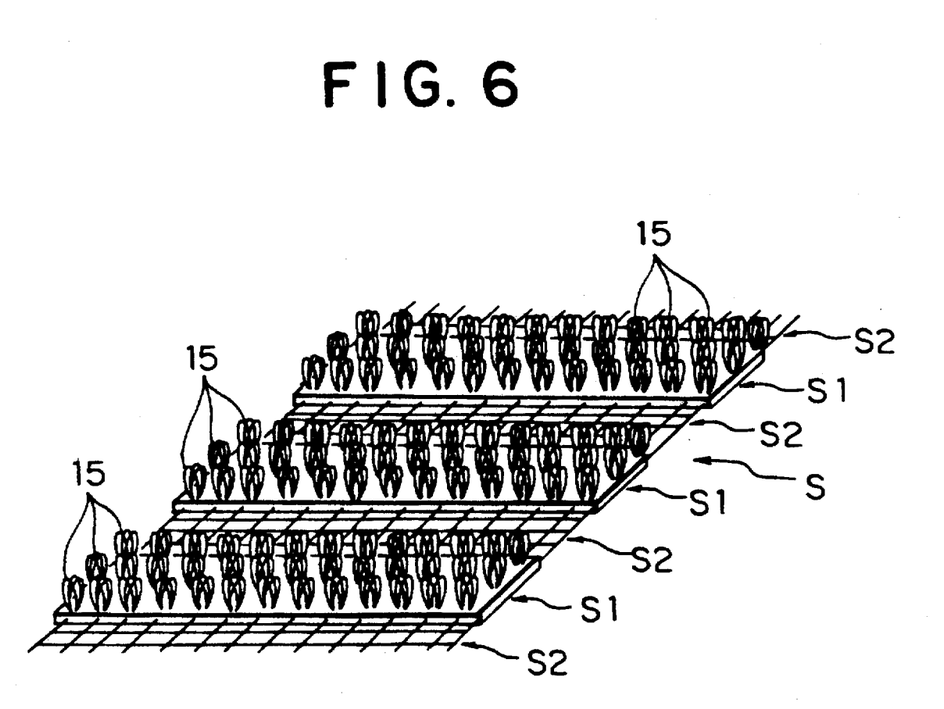
FIG. 6 is a fragmentary perspective view of a modified pile core sheet.

FIG. 6 shows a modified pile core sheet S, in which a number of pile regions S1 and a number of coarse mesh regions S2 are arranged alternately in the longitudinal direction of the pile core sheet S. When this modified pile core sheet S is to be used, the circumferential surface structure of the die wheel 2 is required to be changed to meet the construction of the pile core sheet S. Namely, a number of hook-element-forming cavity sets 5 and a number of pile-receiving recesses 16 are arranged alternately in the circumferential direction of the die wheel. The cross-sectional view of the surface fastener to be molded in this case is shown in FIG. 4E.

Figure 7:
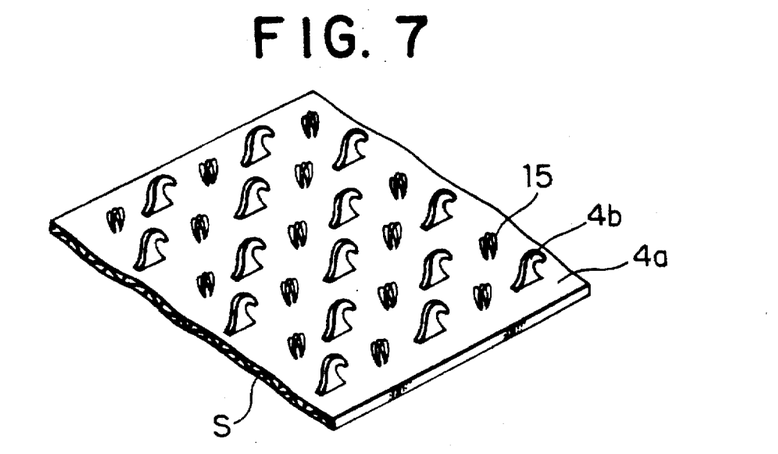
FIG. 7 is a fragmentary perspective view of a typical surface fastener in which hook and loop elements exist mixedly.
Figure 8:
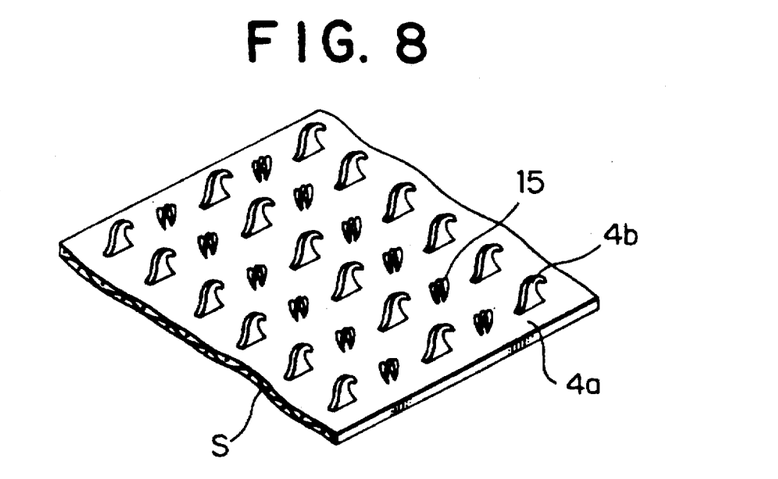
FIG. 8 is a fragmentary perspective view similar to FIG. 7, showing a different pattern of arrangement of hook and loop elements.

FIG. 7 shows a surface fastener in which the hook elements 4b and the loop elements 15 are alternately arranged in the direction either longitudinal or transverse of the substrate sheet 4a. FIG. 8 shows a surface fastener in which the rows of hook elements 4b and the loop elements 15 are alternately arranged in the longitudinal direction of the substrate sheet 4a. For manufacturing the surface fasteners of these shapes shown in FIGS. 7 and 8, each pile core sheet S must have a coarse foundation structure having adequate pores enough to allow molten resin 4 to pass through, and the piles must be formed in a predetermined arrangement and at predetermined intervals.

On the other hand, the die wheel 2 has a number of pile-receiving recesses 16 in the circumferential surface at positions corresponding to the piles and a multiplicity of hook-element-forming cavities 5a between adjacent recesses 16. The distance of the recesses 16 and the hook-element-forming cavities 5a are determined according to the pile distance of the pile core sheet S.

Figure 4D:
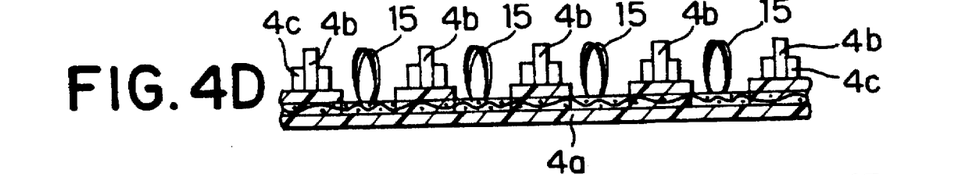
Figure 4E:
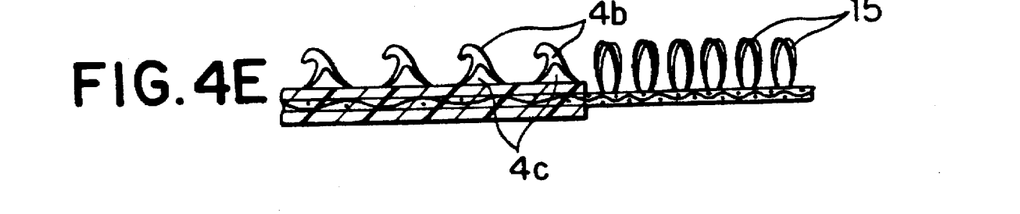
Figure 4F:
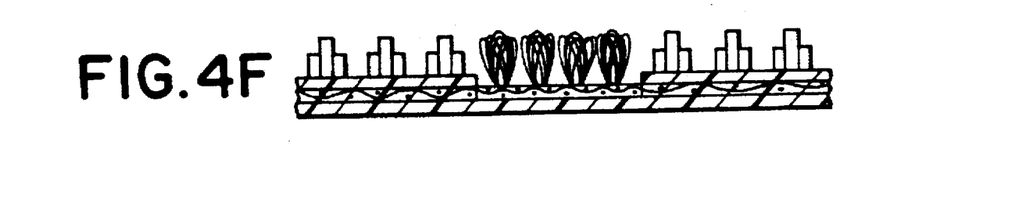

FIGS. 4A through 4E shows various modified surface fasteners in which the hook elements 4b and the loop elements 15 coexist on the same substrate sheet. FIG. 4B schematically shows a cross-sectional structure of the surface fastener manufactured by the apparatus of FIGS. 1 and 5. FIG. 4D schematically show a cross-sectional view of the surface fastener shown in FIG. 7. For manufacturing the surface fastener having a cross-sectional structure of FIG. 4A, the pile core sheet S of FIG. 3 is used, and in the case of continuous injection molding, the injection die 1 has a number of injection outlets 1d transversely spaced at regular distances to meet the hook-element-forming cavity sets 5, and alternatively in the case of extrusion molding, a number of circumferentially extending annular lands are arranged at predetermined spaces in a direction parallel to the axis of the press roller to meet the respective sets of loop elements 15. For manufacturing the surface fastener having a cross-sectional structure of FIG. 4C, the pile core sheet S has a small width, and the pile region S1 is located centrally in the direction transverse of the pile core sheet S while a pair of transversely spaced coarse mesh regions S1 are located at opposite sides of the pile region S1, and other manufacturing conditions are the same as those for the surface fastener of FIG. 4A.

In the foregoing embodiments, the hook elements and the loop elements are formed on the same surface of the substrate sheet. Alternatively, the hook elements may be formed on the front surface of the substrate sheet and the loop elements may be formed on the back surface of the substrate sheet, in such a manner that sets of hook elements and sets of loop elements do not project on the same portion of the substrate sheet so as to be arranged alternately with respect to one another. In this alternative case, the pile surface of the pile core sheet is introduced to the molten resin surface opposite to the die wheel. At that time, as a matter of course, the pile regions and the coarse mesh regions are arranged alternately in the pile core sheet, and the hook-element-forming cavity sets and the smooth surfaces are alternately arranged on the circumferential surface of the die wheel at predetermined spaces in the direction circumferential of the die wheel.

In the foregoing embodiments, the individual hook element 4b has a reinforcing rib 4c on each of opposite side surfaces. The individual hook elements 4b are oriented in a common direction in the same row and are oriented in opposite direction in adjacent rows. The reinforcing ribs 4c, which may be omitted, are effective in preventing the hook elements 4b from falling sideways. In this invention, adjacent hook elements 4b in the same row may be oriented alternately in opposite directions. With this arrangement, a surface fastener which does not have direction in engaging force can be obtained. This invention should by no means be limited to the foregoing embodiments and various modifications may be suggested without departing from the concept of this invention.

As is apparent from the foregoing detailed description, according to this invention, it is possible to continuously manufacture a molded surface fastener in which at least part of foundation structure of the pile core sheet is embedded in the substrate sheet in a single molding step rather than in a plurality of meticulous molding steps, and the obtained surface can secure adequate toughness in the longitudinal and transverse directions at the same time. Further, during the molding, there is no extension difference between the front and back surfaces of the substrate sheet when the surface fastener is peeled off the circumferential surface of the die wheel, and therefore the density of hook elements would be uniform over the entire area so that high-quality products excellent in size precision and having a uniform engaging strength can be achieved.

Further, since the pile core sheet is manufactured by weaving or knitting, it is possible to change the design of the pile core sheet in arrangement and orientation of piles and to determine the size, shape or arrangement of hook elements optionally. It is accordingly possible to cope instantly with various requirements for the surface fastener in which hook and loop elements coexist.

Particularly in this invention, the pile core sheet S is manufactured in a process different from this molding process of the surface fastener and the pile surface of the pile core sheet S is not influences by the molding resin, so that it is possible to treat the pile surface with the napping process prior to the molding of the surface fastener, thus the engaging rate of the product improves. Further, in the case that the height of the hook elements is greater than that of the loop elements, since the hook elements are molded of synthetic resin and not formed of monofilaments so that the individual hook element has at its top a smoothly curved surface with no rough touch and is highly stable in shape, hook elements are easy to engage the loop elements in spite of the short loop elements and the gap between the mating substrate sheets can be reduced to a minimum during engaging.

What is claimed is:

1. A surface fastener molded of synthetic resin, comprising:

(a) a plate-like substrate sheet;
   (b) a multiplicity of hook elements; and
   (c) a multiplicity of loop elements;
   (d) said hook elements being molded of a synthetic resin material integrally with said plate-like substrate sheet on one surface of said plate-like substrate sheet, and said loop elements being composed of piles projecting from a pile woven or knit cloth;
   (e) at least part of a foundation structure of said pile woven or knit cloth being embedded into said substrate sheet simultaneously with the molding of said substrate sheet said hook elements and said loop elements projecting on one side of said surface fastener.

2. A molded surface fastener according to claim 1, wherein said hook elements have a height greater than that of said loop elements.

3. A molded surface fastener according to claim 1, wherein said loop elements are treated with a napping process.

4. A molded surface fastener according to claim 1, wherein said foundation structure of said pile woven or knit cloth is a coarse woven or knit structure having pores large enough to pass molten resin material throughout its entire area, and said hook and loop elements exist mixedly on said one surface of said substrate sheet.

5. A molded surface fastener according to claim 1, wherein said foundation structure of said pile woven or knit cloth is high in density at its pile areas and has a coarse woven or knit structure at the remaining areas coarse enough to pass molten resin material.

6. A molded surface fastener according to claim 1, wherein said hook elements and said loop elements are arranged alternately in parallel predetermined regions on said one surface of said substrate sheet.

* * * * *